United States Patent [19]

Neff et al.

[11] 4,304,958

[45] Dec. 8, 1981

[54] ELECTRICAL OUTLET BOX

[76] Inventors: Steve W. Neff, 847 6th Ave. South, Clinton, Iowa 52732; Harold T. Pate, 33200 Cromwell, Solon, Ohio 44130

[21] Appl. No.: 126,975

[22] Filed: Mar. 3, 1980

[51] Int. Cl.³ .............................................. H02G 3/08
[52] U.S. Cl. .............................. 174/65 R; 339/103 R
[58] Field of Search .............. 174/65 R, 53; 220/3.2, 220/3.3, 3.4, 3.5, 3.6, 3.7, 3.8, 3.9, 3.92, 3.94; 339/103 R, 103 B, 103 C, 107

[56] References Cited

U.S. PATENT DOCUMENTS 3,701,451 10/1972 Schindler et al. ............... 174/53 X
4,202,457  5/1980 Tansi ........................... 220/3.5 X

FOREIGN PATENT DOCUMENTS 658727  3/1963 Canada ........................ 174/65 R

*Primary Examiner*—Gene Z. Rubinson
*Assistant Examiner*—D. A. Tone

[57] ABSTRACT

An electrical outlet box which includes side walls and a back wall and has an opening opposite the back wall. Screw-receiving retainer lugs are provided on the side walls to facilitate attachment of a cover plate to the box, and a plurality of conductor windows are provided in the box at the intersection of the back wall with one or more side walls. A flexible, resilient arcuate locking tongue carries locking teeth on a convex, outwardly facing side of the tongue for locking, tangential contact with an electrical conductor extended through the respective conductor window and against the locking tongue while the locking tongue is in a deflected status. Cusps having arcuate ramp surfaces are formed on the back wall to guide conductors inserted into the box through the windows into the interior of the box.

16 Claims, 8 Drawing Figures

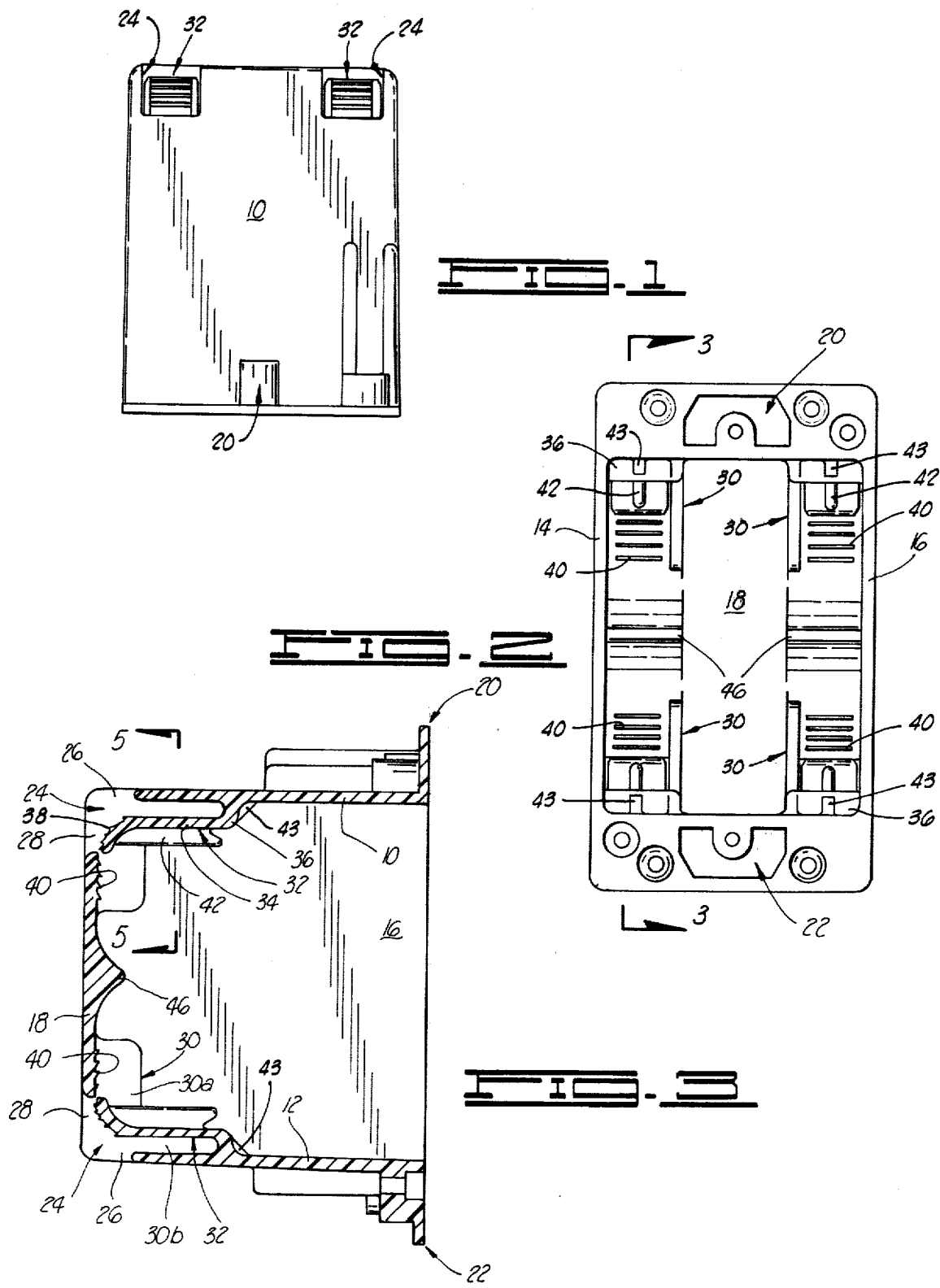

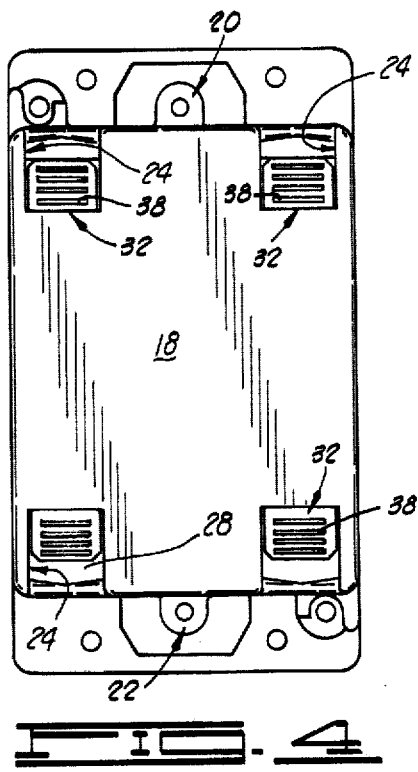
FIG. 4
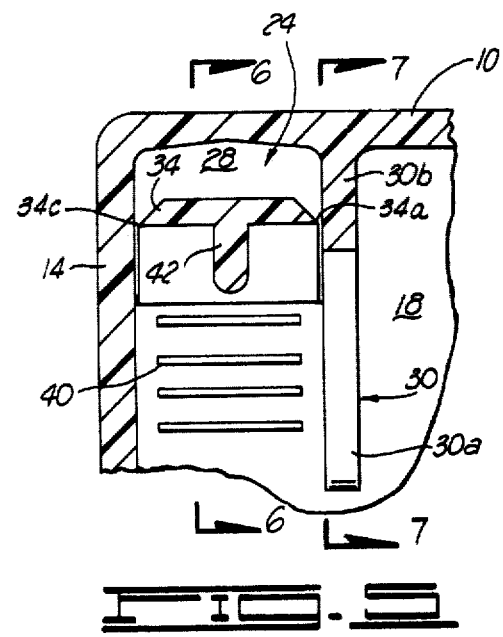
FIG. 5
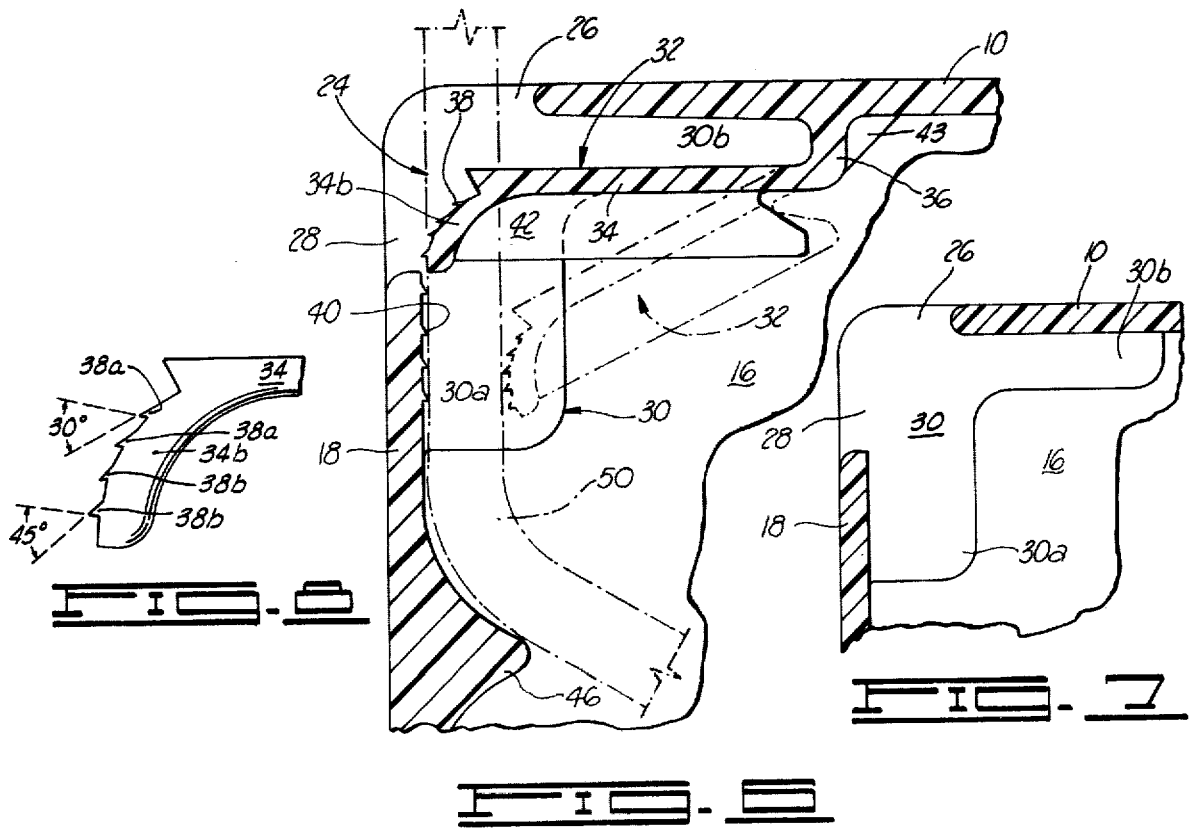
FIG. 6
FIG. 7

ELECTRICAL OUTLET BOX

BACKGROUND OF THE INVENTION

1. Field of the Invention

This invention relates to electrical outlet boxes, and more particularly, by not by way of limitation, to synthetic resin outlet boxes of the type which are open at one side, and which carry a plurality of knock-out panels or conductor windows facilitating the insertion of electrical conductors through one or more side walls of the box.

2. Brief Description of the Prior Art

A number of patents have been issued on various types of synthetic resin and metal electrical outlet boxes adapted to be mounted in a wall or ceiling, and to have electrical conductors extended into the box for connection to contacts or terminals there located. In many of these boxes, frangible window structures are provided which can be opened by the use of a screwdriver or similar implement to provide easily accessible openings for the purpose of extending the electrical conductors into the box. Typical of patents of this type are Pate et al. U.S. Pat. No. 4,036,389, Paskert U.S. Pat. No. 3,952,475, Robinson et al. U.S. Pat. No. 3,895,732 and Copp U.S. Pat. No. 3,773,968. All of these patents disclose synthetic resin boxes having rectangular windows formed therein with a frangible or removable panel blocking this window prior to the time the window is used to accommodate an electrical conductor extended into the interior of the box. Some type of implement, such as a screwdriver, is needed to pry out the panels which block or close the conductor windows.

Other patents which show boxes having removable windows for the purpose of accommodating electrical conductors include Salg U.S. Pat. No. 3,891,113, Salg U.S. Pat. No. 3,848,764, Pringle U.S. Pat. No. 3,876,821 and Trachtenberg et al. U.S. Pat. No. 3,575,313.

In U.S. Pat. No. 2,828,147 to Peiffer, the patentee proposes to secure a conductor extended through an open window in the side of an electrical outlet box by using a wedge forced into the window between the conductor and a wall of the box, with the wedge carrying a plurality of teeth which bite into the insulation of the conductor and wedge it into position in the box and prevent it from being extricated therefrom.

A similar teaching appears in French Pat. No. 2,259,462. This patent discloses the use of trapezoidally shaped wedges having teeth on the opposite sides thereof to engage both a conductor extended through an opening and the structure which surrounds and defines the opening.

The foregoing patents represent the closest prior art known to Applicant, and copies of such prior art patents will be submitted for the Examiner's perusal and review as soon as they are obtained.

BRIEF DESCRIPTION OF THE PRESENT INVENTION

The present invention provides an improved electrical outlet box which more positively engages an electrical cable or a conductor extended through the side wall of the box to the interior thereof for supplying power to the box. The cable is positively retained relative to the box by a positively acting, novel locking tongue which affords minimum obstruction to installation of the box and cable in dry wall or ceiling constructions.

Broadly described, the electrical outlet box of the invention includes one or more side walls which surround the interior of the box and intersect a back wall which, in most instances, will extend normal to the side walls. The box is open at the opposite side of the box from the back wall. Screw-engaging lugs are provided to facilitate securement of a cover plate over the open front side of the box. At a location where a side wall of the box intersects the back wall, a large cable or conductor opening or window is provided to accommodate the extension of an electrical conductor from the outside to the inside of the box. The conductor window is closed prior to insertion of the cable by an arcuate locking tongue which is hinged at one end to a side wall of the box. The locking tongue has sufficient flexibility and resiliency to permit it to be deflected at the time the conductor is inserted through the wall of the box, but to cause the locking tongue to bear resiliently against the conductor after insertion. The flexible arcuate locking tongue carries locking teeth on a convex, outwardly facing side of the tongue for tangential locking contact with the conductor extended through the conductor window and against the locking tongue.

The construction of the locking tongue, in cooperation with certain teeth provided on the back wall of the box in a preferred embodiment of the invention, assures a positive interlocking engagement of the teeth carried on the locking tongue with the insulation carried on a conductor inserted through the conductor window. The conductor thus cannot be easily extricated from the box, or even shifted in its position relative to the box, once engagement by the locking tongue is effected.

An important object of the invention is to provide an improved electrical outlet box which lends itself to fabrication by molding of synthetic resins, and which includes a novel conductor locking tongue and associated conductor window which permit a conductor to be passed from the outside to the inside of the box and securely engaged against extrication of the conductor after such placement.

Another object of the invention is to provide, in an electrical outlet box, a conductor locking tongue and associated conductor window which facilitate rapid manual insertion of an electrical conductor from the outside to the inside of the box, followed by automatic interlocking of the locking tongue with the insulation on the conductor to retain the conductor in fixed relation to the box, and to prevent shifting or sliding of the conductor after it has been connected to terminals inside the box.

Another object of the invention is to provide an electrical outlet box which includes inwardly projecting cusps on the inside walls thereof which effectively deflect electrical conductors passed into the box through the walls thereof to an interior location facilitating their connection to internal terminals.

A further object of the invention is to provide a synthetic resin electrical outlet box which is sturdy in construction, presents no injection molding problems during fabrication, and which includes an improved means by which cables or conductors can be inserted through the wall of the box to the interior thereof, and retained in a fixed position once such cable or conductor has been inserted or connected.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

FIG. 1 is a side elevation view of an electrical outlet box constructed in accordance with the invention, and illustrating portions of a pair of locking tongues.

FIG. 2 is a front elevation view of the electrical outlet box shown in FIG. 1 as the box appears when viewed from the open side thereof.

FIG. 3 is a sectional view taken along lines 3—3 of FIG. 2.

FIG. 4 is a rear elevation view of the electrical outlet box.

FIG. 5 is a sectional view taken in a plane corresponding to the plane denominated by section line 5—5 in FIG. 3.

FIG. 6 is a sectional view taken along line 6—6 of FIG. 5, and illustrating in dashed lines a conductor extended through a conductor window, and one of the locking tongues displaced to a conductor-engaging, locking position.

FIG. 7 is a section line taken along line 7—7 of FIG. 5.

FIG. 8 is an enlarged detail view of the arcuate toe portion of a locking tongue forming a part of the invention.

DETAILED DESCRIPTION OF A PREFERRED EMBODIMENT OF THE INVENTION

An electrical outlet box constructed in accordance with the present invention is illustrated in FIGS. 1-4 of the drawings. The box is preferably formed of a suitable synthetic resin, such as polyvinyl chloride, by an injection molding procedure, although other resins and non-resins and other fabrication procedures can be utilized within the principles of the invention.

The illustrated synthetic resin box includes, in the form shown, four substantially rectangular side walls 10, 12, 14 and 16. The box also includes a rear or back wall 18 which extends perpendicularly to, and interconnects, the side walls 10-16. The box is thus shaped as a right parallelepiped, and as is conventional in the construction of such boxes, includes an open front side which is located opposite the rear or back wall 18.

Along the edges of the side walls 10 and 12 which bound the opening at one side of the box, the side walls carry screw-engaging lugs 20 and 22. These lugs 20 and 22 are of conventional construction, and function to receive screws or other fastening elements used to hold a socketed cover plate on the open side of the box after the box has been installed, and the appropriate electrical leads and conduits have been connected to terminals interiorly of the box.

In order to enable electrical leads to be extended from the outside to the inside of the box, a plurality of conductor windows 24 are provided along the lines of intersection of the side walls 10 and 12 with the back wall 18. Each of the conductor windows 24 is of generally L-shaped configuration and extends across an approximate line of intersection of one of the side walls 10 or 12 with the back wall 18. Each conductor window includes a first rectangular opening 26 which extends from this line of intersection along the respective side wall toward the front side of the box, and a second rectangular opening 28 which intersects the first rectangular opening and extends at a right angle thereto into the back wall 18 as shown in FIGS. 3 and 6.

Projecting inwardly into the interior of the box from the back wall 18 and from the respective side wall adjacent each conductor window 24 formed therethrough is an L-shaped guide plate 30. Each of the guide plates is positioned in a plane which extends parallel to the respective adjacent side wall of the box which defines a portion of the conductor window bounded by the guide plate. The configuration of one of the guide plates 30 is best illustrated in FIGS. 5 and 6. Each guide plate 30 includes a rectangular first portion 30a which projects normal to the back wall 18 into the interior of the box, and a rectangular second portion 30b which extends inwardly from a line of intersection with the respective side wall in which the conductor window 36 is located, and is formed integrally and extends in coplanar alignment with the rectangular first portion. Each of the guide plates 30 is molded integrally with the two intersecting walls which include the back wall 18 and the respective side wall in which the respective conductor window 24 is formed.

An elongated flexible resilient locking tongue 32 is associated with each conductor window 24. Each tongue 32 is molded integrally with the side wall of the box in which its associated conductor window 24 is located and includes a rectangular locking plate 34 and a hinge web 36 through which the locking plate is joined to the adjacent side wall. It will be perceived as reference is made to FIGS. 5 and 6 that the locking plate 34 of each locking tongue includes a pair of parallel side edges 34a and 34c and extends from its respective hinge web 36 into the adjacent conductor window 24 toward the back wall 18.

At its free end opposite the end molded integrally with the hinge web 36, each locking plate 34 curves through an angle of about 90° and has an arcuate end portion or locking toe 34b formed thereon. The inner side of the locking toe 34b toward the inside of the box is concave, and the outer side carries a plurality of parallel, spaced transverse teeth or serrations 38. The teeth 38 extend substantially normal to the side edges 34a and 34c of the locking plate. At the location where the toe 34b terminates adjacent the back wall 18, the back wall 18 carries a plurality of parallel, spaced internal teeth or serrations 40 which extend parallel to the teeth 38. A reinforcing and stiffening rib 42 is carried on the central portion of the inner side of each locking plate 34, and is of the configuration shown in FIGS. 5 and 6. A bracing gusset 43 is utilized to have the inner side of each hinge web 36.

The included angles defined by the locking toe teeth 38 are varied to afford positive one-way engagement with various sizes of conductor which may be extended through the conductor window 36 into the interior of the box in a manner hereinafter described. Thus, as shown in FIG. 8, each of the locking toe teeth 38a includes an angle of 30°, whereas each locking toe tooth 38b includes an angle of 45°.

In referring to FIGS. 1, 5 and 6, it will be noted that each locking tongue 32 has a transverse width which is only slightly less than the transverse width of the respective conductor window 24. It will further be noted in referring to FIG. 6 that the toe portion 34b of each locking tongue 32 terminates slightly inwardly from the internal surface of the back wall 18, and in its at-rest position before insertion of a conductor, blocks or closes the second rectangular window 28. This arrangement facilitates the inward pivotation or flexing of the locking tongue 32 at a time when this movement is necessary to accommodate the insertion of an electrical conductor through the conductor window 24 to the interior of the box.

At a location which is disposed substantially midway between the pairs of teeth 40 adjacent aligned corners of the back wall 18, the back wall has a cusp 46 molded integrally thereupon and projecting inwardly into the box as shown in FIGS. 2, 3 and 6. There are thus two of the cusps 46 molded at about the midpoint along the opposed side edges of the back plate 18. Each cusp 46 has two opposed arcuate, concave ramp surfaces which intersect at the point of the cusp and function to guide and direct a conductor cable into the interior of the box in the manner shown in FIG. 6.

In the utilization of the electrical outlet box of the invention, a plurality of electrical conductors, such as that illustrated in FIG. 6 in dashed lines and denominated by reference numeral 50, are inserted through the several conductor windows 24 which are provided. This is accomplished by deflecting inwardly the locking tongue 32 which substantially fills each of these windows as the end portion of the conductor to be secured to a terminal inside the box is pressed through the respective conductor window. Flexing of each locking tongue 32 occurs at the hinge plate 36 of the respective locking tongue. The locking plate 34 of the locking tongue remains relatively rigid and straight due to the reinforcing and rigidifying function of the stiffening rib 42.

It will be noted in FIG. 6 that as the conductor 50 is forced past the locking tongue 32 through the conductor window 24, the conductor can easily slide over the locking teeth 38 and 40, and that the end of the conductor is guided inwardly into the interior of the box by the concave ramp surface of the respective interposed cusp 46. After the conductor is positioned and is connected to a terminal inside the box, one or more teeth 38 carried on the convex side of the arcuate toe portion 34b of the locking tongue bite into and engage insulation carried on the outer side of the conductor 50. The pitch and inclination of the several teeth 38 is such that extrication of the conductor due to a pulling force being applied to the conductor outside the box is resisted by the engaging action of the teeth. The configuration and location of the teeth 40 carried on the back wall 18 has a similar locking action in preventing the extrication of the conductor 50 from the box. Also, as previously noted, the teeth 38 are differently configured so that if a relatively larger conductor is inserted, it is engaged by the locking toe teeth spaced farthest inwardly from the free end of the locking toe. These teeth include a substantially smaller angle than the locking toe teeth which are relatively near to the free end of the locking toe, and this permits them to bite into and engage the insulation of the conductor quite effectively even though the locking toe is pivoted inwardly through a relatively greater angle as a result of the insertion of the relatively larger conductor.

From the foregoing description of the invention, it will be apparent that each locking tongue and its associated conductor window provided in the electrical outlet box of the invention facilitate rapid manual insertion of an electrical conductor from the outside to the inside of the box, but tenaciously resist extrication or pull-out of the conductor once it has been extended through the conductor window past the locking tongue. Further, the configuration and geometry of the locking tongue makes the structure easily fabricated by injection molding, and an integrally molded synthetic resin box is the preferred form of the invention. It will be noted that the guide plate 30 along with the particular side wall which is adjacent each of the windows provide a continuous guiding function, both of the conductor as its free end is moved into the interior of the box, and of the locking tongue as it undergoes flexure inwardly into the box.

Although a preferred embodiment of the invention has been herein described in order to illustrate the basic principles which underlie the invention, it will be understood that various changes and innovations can be effected in the illustrated and described structure without departure from the basic principles which underlie the invention. Changes and innovations of this type are therefore deemed to be circumscribed by the spirit and scope of the invention, except as the same may be necessarily limited by the appended claims or reasonable equivalents thereof.

What is claimed is:
1. An electrical outlet box which comprises:
a back wall;
side wall means surrounding the hollow interior of the box and intersecting the back wall at a right angle and defining with said back wall a conductor window of substantially L-shaped configuration adjacent the line of intersection between the side wall means and the back wall;
a flexible, resilient locking tongue having one end connected to the side wall means and having an arcuate end portion opposite said one end, said arcuate end portion having a concave side interiorly of the box, and a convex side facing exteriorly of the box, said tongue being of substantially L-shaped configuration and substantially filling said conductor window, with said arcuate end portion terminating adjacent said back wall, and said tongue being resiliently flexible into the interior of the box;
teeth on the convex side of the arcuate end portion of said tongue;
a guide plate projecting from said side wall means and said back wall into the interior of the box at a location adjacent the conductor window, and positioned in a plane extending parallel to the direction of flexible movement of the tongue into the interior of the box, and positioned immediately adjacent said tongue; and
said side wall means including a portion thereof cooperating with said guide plate and positioned immediately adjacent said tongue on the opposite side thereof from said guide plate and cooperating with said guide plate to guide said tongue during its flexing movement into the interior of the box and to guide a conductor inserted through said window.

2. An electrical outlet box as defined in claim 1 wherein said teeth are successively angled and spaced along the convex side of the arcuate end portion to facilitate engagement of various sizes of conductor by at least a part of the teeth when such conductors are extended from outside said box to the inside of said box through said conductor window to deflect said tongue into the interior of the box.

3. An electrical outlet box as defined in claim 1 and further characterized as including a reinforcing rib on the side of said tongue which faces the inside of the box and extending from a location adjacent said one end of the tongue to a location on the concave side of said arcuate end portion.

4. An electrical outlet box as defined in claim 1 wherein said conductor window has a rectangular first portion in said side wall means, and a rectangular second portion in said back wall, and said tongue includes a hinge web forming said one end, and a substantially rectangular locking plate connected to said hinge web.

5. An electrical outlet box as defined in claim 4 wherein said locking plate has a pair of opposed, parallel side edges extending from said one end to the end of said arcuate end portion, and wherein said teeth extend parallel to each other and transversely across said arcuate end portion in a direction substantially normal to said side edges.

6. An electrical outlet box as defined in claim 4 wherein said side wall means includes four side walls rectangularly interconnected to form, with said back wall, a right parallelepiped, and wherein said L-shaped conductor window is, in part, located in one of said side walls at a position immediately adjacent a second of said side walls.

7. An electrical outlet box as defined in claim 6 wherein said teeth are successively angled and spaced along the convex side of the arcuate end portion to facilitate engagement of various sizes of conductor by at least a part of the teeth when such conductors are extended from outside said box to the inside of said box via said window to deflect said tongue into the interior of the box.

8. An electrical outlet box as defined in claim 7 wherein said tongue includes a pair of opposed, parallel side edges extending from said one end to the end of said arcuate end portion, and wherein said teeth extend parallel to each other and transversely across said arcuate end portion in a direction substantially normal to said side edges.

9. An electrical outlet box as defined in claim 6 and further characterized as including teeth on said back wall adjacent said window positioned for cooperation with said first mentioned teeth in engaging a conductor extended through said window.

10. An electrical outlet box as defined in claim 9 and further characterized as including an inwardly projecting cusp on said back wall and aligned with and spaced from said conductor window and spaced from said tongue for guiding an end of a conductor inserted through said window into the interior of the box and away from said back wall.

11. An electrical outlet box as defined in claim 1 and further characterized as including an inwardly projecting cusp on said back wall and aligned with said conductor window and spaced from said tongue for guiding an end of a conductor inserted through said window into the interior of the box.

12. A synthetic resin electrical outlet box comprising:
a back wall;
a plurality of side walls each intersecting said back wall at a right angle and forming an open-sided right parallelepiped therewith, at least one of said side walls defining with said back wall at least one conductor window located adjacent a second of said side walls, said second side wall forming a conductor guide for a conductor inserted through said conductor window;
flexible, resilient locking tongues substantially closing each of said conductor windows and each pivotally secured in said box for pivotation at a location immediately adjacent the respective adjacent second side wall, each of said locking tongues including:
a hinge web secured to the one of said side walls in which the respective conductor window is located;
an elongated locking plate having a first end hingedly joined to, and formed integrally with, said hinge web, and having a second end;
an arcuate toe formed on the second end of said locking plate and having a concave side on the inside of the box and a convex side facing the outer side of the box, said locking plate and arcuate toe substantially filling and blocking the respective conductor window in which said locking tongue is located; and
teeth extending across each arcuate toe on the convex side thereof and extending perpendicularly to lines projected normal to the respective side wall to which the respective locking tongue including the respective toe is joined; and
a guide plate projecting from each one of said side walls which defines with said back wall a conductor window and located immediately adjacent the respective conductor window and positioned cooperatively with said respective second side wall for forming a path of guidance for a respective flexible, resilient locking tongue when said respective locking tongue undergoes pivotation to admit a conductor inserted into said box through said respective conductor window.

13. A synthetic resin electrical outlet box as defined in claim 12 and further characterized as including teeth on said back wall adjacent each said opening cooperating with said first-mentioned teeth for engaging a conductor extended through the respective conductor window.

14. In an electrical outlet box of the type which includes a plurality of side walls, a back wall which extends normal to the side walls, and an open front opposite the back wall, the improvement which comprises:
a conductor window formed in, and defined by, the back wall and one of said side walls;
a flexible, resilient locking tongue hingedly connected to said one side wall, and, in an at-rest, non-deflected position extending into and blocking said conductor window;
first teeth carried on said locking tongue for engaging a conductor extended through said window;
second teeth carried on said back wall adjacent said window at a location for cooperating with said first teeth in engaging a conductor extended through said window; and
concavely arcuate cusp means secured to said back wall at a location spaced from said window and locking tongue in a direction spaced toward another of said side walls from said one side wall and projecting from said back wall into the interior of the box at a location aligned with and spaced from said second teeth for deflecting toward the interior of the box, a conductor extended into said box through said window and along said back wall.

15. The electrical outlet box claimed in claim 14 and further characterized as including guide means in said box for guiding a conductor into the box along a path between said locking tongue and back wall and toward said cusp means.

16. A synthetic resin box structure comprising:
a plurality of intersecting walls defining an enclosure;

a window at the intersection of two walls and having a portion in one of the two walls and a portion in the other of the two walls;

a flexible, resilient locking tongue pivotally connected to said one of said two walls and extending as a cantilever into said window for blocking said window;

cooperating teeth on said tongue and said other of said two walls positioned for cooperative engagement with an elongated electrical conductor extending through said window from the outside to the inside of the box; and means for guiding an elongated electrical conductor through said window, along a portion of said other of said two walls and thence toward the center of the interior of the box, said guide means including:

a guide plate projecting from one of said two walls away from the other of the two walls and toward the interior of said box structure adjacent said locking tongue and said window;

a portion of a third of said intersecting walls, said portion projecting parallel to said guide plate and positioned on the opposite side of said flexible locking tongue and said window from said guide plate at a location adjacent said window; and a cusp having an arcuate, concave surface aligned with said window at a location interiorly of the box and spaced from said window and from said locking tongue along said other of said two walls whereby a conductor extended through said window and into engagement with said cooperating teeth will, upon further extension past said cooperating teeth, contact said cusp and be deflected by said cusp toward the interior of said box structure.

* * * * *